United States Patent
Kim (10) Patent No.: US 8,828,571 B2
(45) Date of Patent: Sep. 9, 2014

(54) SECONDARY BATTERY

(75) Inventor: Dukjung Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 104 days.

(21) Appl. No.: 13/137,682

(22) Filed: Sep. 2, 2011

(65) Prior Publication Data

US 2012/0196166 A1  Aug. 2, 2012

(30) Foreign Application Priority Data

Jan. 27, 2011 (KR) .................. 10-2011-0008124

(51) Int. Cl.
| H01M 4/00 | (2006.01) |
| H01M 2/22 | (2006.01) |
| H01M 10/04 | (2006.01) |
| H01M 2/20 | (2006.01) |
| H01M 2/24 | (2006.01) |
| H01M 2/26 | (2006.01) |

(52) U.S. Cl.
CPC ...... *H01M 10/0413* (2013.01); *H01M 2220/20* (2013.01); *H01M 2/24* (2013.01); *H01M 2/263* (2013.01); *H01M 2/22* (2013.01); *Y02E 60/12* (2013.01); *H01M 2/206* (2013.01); *H01M 10/0431* (2013.01)
USPC ............... 429/94; 429/162; 429/163

(58) Field of Classification Search
CPC ..................................... H01M 2/263

USPC ............................ 429/94, 162, 163
See application file for complete search history.

(56) References Cited

U.S. PATENT DOCUMENTS

2011/0171516 A1* 7/2011 Byun et al. .............. 429/161

FOREIGN PATENT DOCUMENTS

| JP | 2000-223109 | | 8/2000 |
| JP | 2002-231214 | A | 8/2002 |
| JP | 2010-287490 | A | 12/2010 |
| KR | 10-2004-0092533 | A | 4/2004 |
| KR | 10-2004-0054201 | A | 6/2004 |
| KR | 2004-0092533 | A | 11/2004 |
| KR | 10-2009-0008071 | A | 1/2009 |

OTHER PUBLICATIONS

Korean Notice of Allowance dated Jan. 8, 2013.

* cited by examiner

*Primary Examiner* — Jane Rhee
(74) *Attorney, Agent, or Firm* — Lee & Morse, P.C.

(57) ABSTRACT

A secondary battery includes a plurality of electrode assemblies, a current collector electrically connected to each of the electrode assemblies, a case accommodating the plurality of electrode assemblies and the current collector, a cap plate sealing the case, and an electrode terminal electrically connected to the current collector and penetrating the cap plate, wherein the plurality of electrode assemblies are arranged such that an axis of each electrode assembly is parallel to a bottom surface of the case and the plurality of electrode assemblies are disposed in a longitudinal direction.

10 Claims, 8 Drawing Sheets

SECONDARY BATTERY

BACKGROUND

1. Field

Embodiments relate to a secondary battery.

2. Description of the Related Art

Unlike a primary battery, a rechargeable battery may be recharged. Low-capacity batteries that comprise a single battery cell that is packaged in the form of a pack are used as a power source for small portable electronic devices such as mobile phones or camcorders. Large batteries that comprise a plurality of battery cells that are connected together are used as a power source for driving motors, such as those for electric scooters, hybrid electric vehicles (HEV), or electric vehicles.

A rechargeable battery may be formed with various shapes, such as a cylindrical shape and a prismatic shape. The rechargeable battery comprises an electrode assembly with positive and negative electrode plates between which a separator is interposed, a case mounting the electrode assembly therein together with an electrolyte, and a cap assembly fitted to the case. Positive and negative electrode terminals are electrically connected to the electrode assembly and are exposed or protrude to the outside through the cap plate.

SUMMARY

According to an embodiment of the present invention, there is provided a secondary battery including a plurality of electrode assemblies, a current collector electrically connected to each of the plurality of electrode assemblies, a case accommodating the plurality of electrode assemblies and the current collector, a cap plate sealing the case, and an electrode terminal electrically connected to the current collector and penetrating the cap plate, wherein the plurality of electrode assemblies are arranged such that an axis of each electrode assembly is parallel to a bottom surface of the case and the plurality of electrode assemblies are disposed in a longitudinal direction.

The secondary battery may further include an insulating member between the current collector and the cap plate and between the electrode terminal and the cap plate.

The plurality of electrode assemblies may include an upper electrode assembly and a lower electrode assembly, and the upper electrode assembly and the lower electrode assembly may have different sizes.

Each electrode assembly may be configured such that a first electrode plate and a second electrode plate, each having an electrode uncoated portion, are wound about a winding axis with a separator interposed therebetween, and the electrode uncoated portion of the first electrode plate and the electrode uncoated portion of the second electrode plate are formed at opposite ends of the electrode assembly in a direction of the winding axis thereof.

Each electrode assembly may be pressed to have a pair of planar surfaces, and each planar surface of the pair of planar surfaces may be disposed to face a respective one of a pair of long side surfaces of the case.

The current collector may include a first connection unit having a terminal hole and coupled with the electrode terminal and a second connection unit having a plurality of protruding parts, each protruding part being connected to an electrode uncoated portion of one of the electrode assemblies, and the second connection unit extending lengthwise from one end of the first connection unit.

The second connection unit may be vertically bent from one end of the first connection unit, and each protruding part may protrude in a direction facing the electrode uncoated portion of one of the electrode assemblies.

The plurality of electrode assemblies may include an upper electrode assembly and a lower electrode assembly, and a volume of a region of the second connection unit connected to the lower electrode assembly may be greater than that of a region of the second connection unit connected to the upper electrode assembly.

Each protruding part may be inserted into a winding core of one of the electrode assemblies to contact the electrode uncoated portion of the electrode assembly.

Each electrode uncoated portion of the plurality of electrode assemblies may be welded in a state in which the electrode uncoated portion is bent toward the winding core of the electrode assembly.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Korean Patent Application No. 10-2011-0008124, filed on Jan. 27, 2011, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

When elements are referred to as being "connected" to other elements, the elements can be "directly connected" to one another, or can be "electrically connected" to one another with other elements interposed therebetween.

Figure 1:
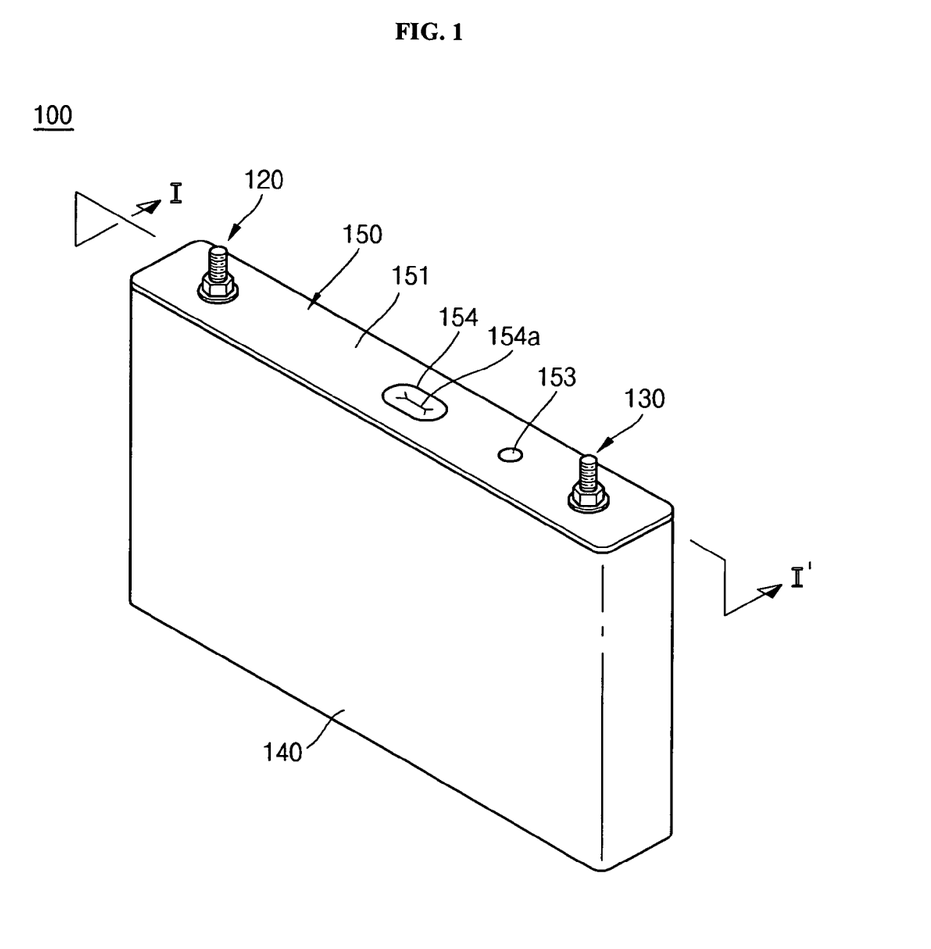
FIG. 1 illustrates an assembled perspective view of a rechargeable battery according to an exemplary embodiment.
Figure 2:
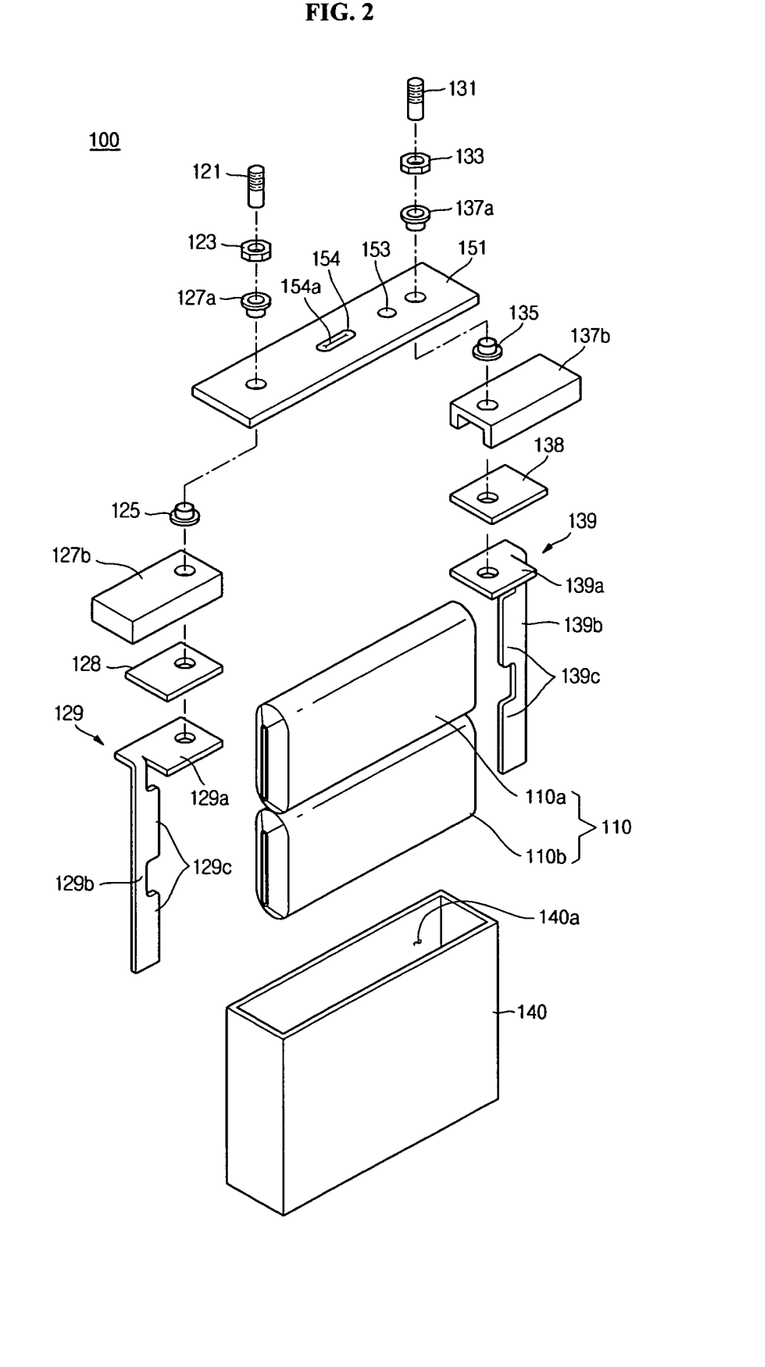
FIG. 2 illustrates an exploded perspective view of a rechargeable battery according to an exemplary embodiment.
Figure 3:
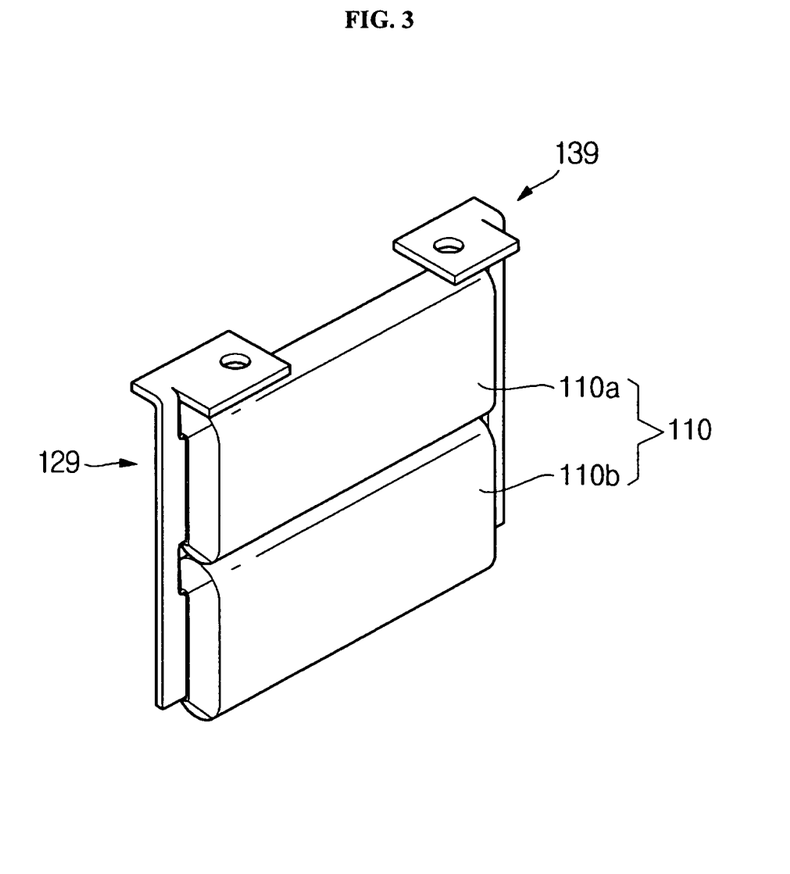
FIG. 3 illustrates an assembled perspective view of a current collector and an electrode assembly according to an exemplary embodiment.
Figure 4A:
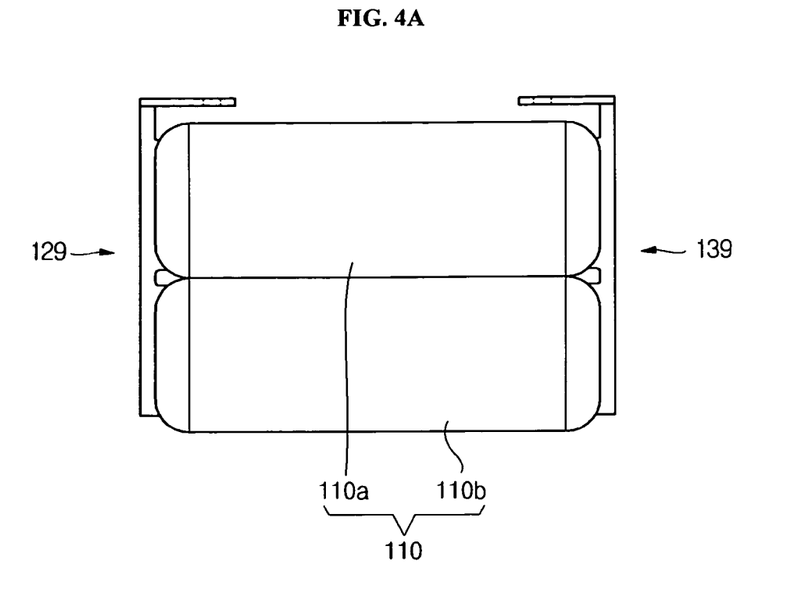
FIG. 4A illustrates a front view of FIG. 3.
Figure 4B:
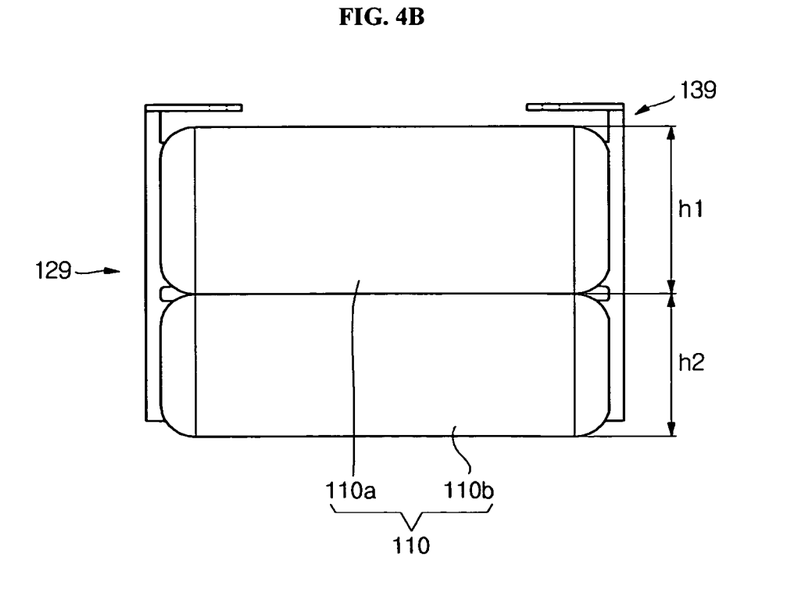
FIG. 4B is a front view illustrating another example of an electrode assembly.
Figure 5A:
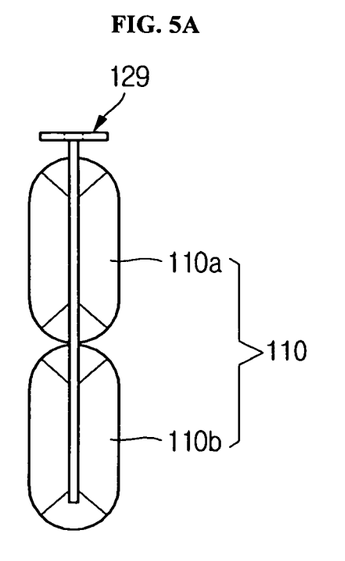
FIG. 5A illustrates a side view of FIG. 3.
Figure 5B:
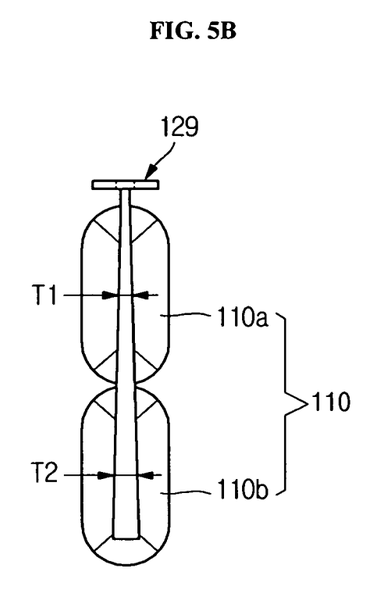
FIG. 5B is a side view illustrating another example of a current collector and electrode assembly.
Figure 5C:
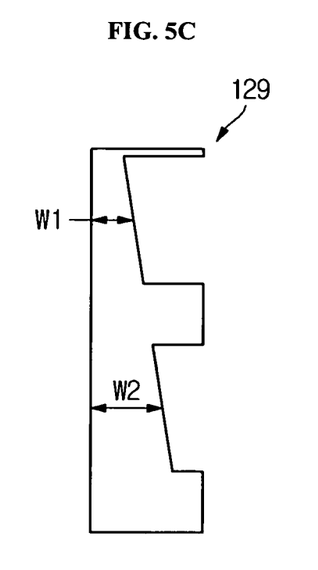
FIG. 5C is a front view illustrating another example of a current collector.
Figure 6:
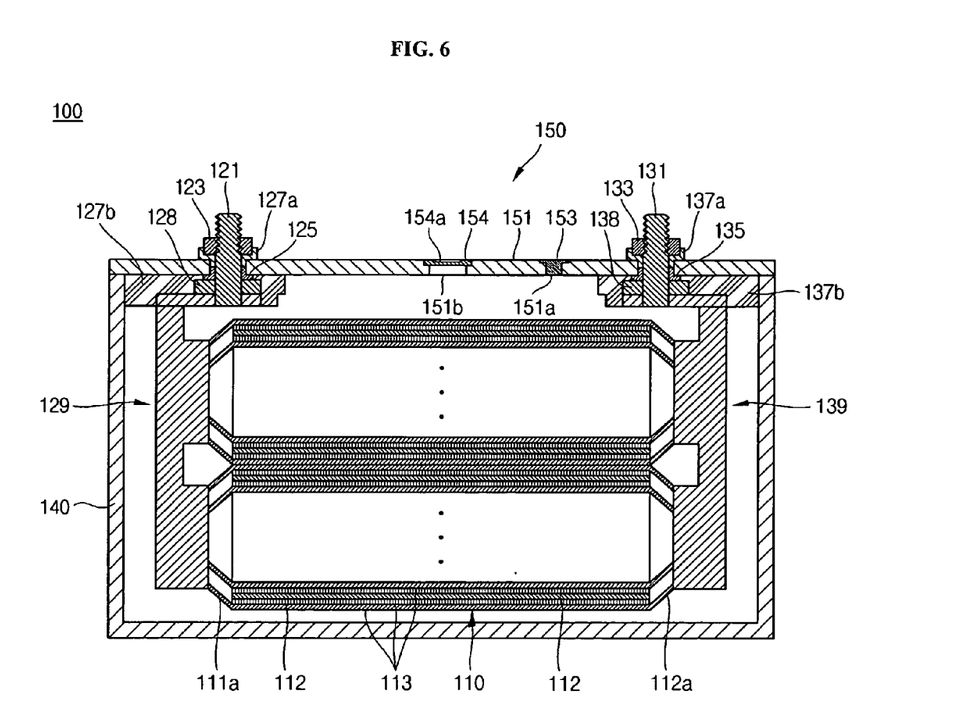
FIG. 6 illustrates a cross-sectional view of the rechargeable battery taken along line I-I' of FIG. 1.

FIG. 1 is an assembled perspective view of a rechargeable battery according to an exemplary embodiment. FIG. 2 is an exploded perspective view of a rechargeable battery according to an exemplary embodiment. FIG. 3 is an assembled perspective view of a current collector and an electrode assembly according to an exemplary embodiment. FIG. 4A is a front view of FIG. 3, and FIG. 4B is a front view illustrating another example of an electrode assembly. FIG. 5A is a side view of FIG. 3. FIG. 5B is a side view illustrating another example of a current collector and electrode assembly, and FIG. 5C is a front view illustrating still another example of a current collector. FIG. 6 is a cross-sectional view of the rechargeable battery taken along line I-I' of FIG. 1.

Referring to FIGS. 1 to 6, the secondary battery 100 according to the embodiment includes an electrode assembly 110, a first terminal 120, a second terminal 130, a case 140, and a cap assembly 150.

The electrode assembly 110 includes a plurality of winding type electrode assemblies 110a and 110b, which are vertically arranged in the case 140. That is to say, the respective electrode assemblies 110a and 110b are arranged in a direction perpendicular to the winding axis of the electrode assemblies 110a and 110b to then be housed in the case 140. In addition, the electrode assemblies 110a and 110b are disposed such that the winding axis is parallel with the bottom surface of the case 140. In the illustrated embodiment, two of the electrode assemblies 110a and 110b are disposed such that one electrode assembly 110a is at an upper portion of the case 140 and another electrode assembly 110b is at a lower portion of the case 140. Herein, the term "upper portion" may refer to a portion nearest to a cap plate 150, described below, and the term "lower portion" may refer to a portion nearest to the closed bottom. The embodiments are not limited to secondary batteries having two electrode assemblies. More electrode assemblies may be provided according to the size and capacity of battery. In such a case, the electrode assemblies may be stacked one above the other in the same manner as shown in FIG. 2.

The electrode assemblies 110a and 110b may be formed by winding a first electrode plate 111 and a second electrode plate 112, formed of a thin plate or layer, with a separator 113 interposed therebetween. The electrode assemblies 110a, 110b may be pressed, thereby providing each electrode assembly with at least one pair of planar surfaces. Each planar surface of the pair of planar surfaces of an electrode assembly may be disposed to face a respective inner surface of a pair of wide sides of the case 140.

The upper electrode assembly 110a and the lower electrode assembly 110b may be formed to have the same size, as shown in FIG. 4A. Alternatively, as shown in FIG. 4B, the upper electrode assembly 110a and the lower electrode assembly 110b may be formed to have different sizes. The upper electrode assembly 110a may be larger than the lower electrode assembly 110b, or vice versa. A size difference of the electrode assemblies 110a and 110b may be determined by a difference between their heights h1 and h2. For example, the height h1 of the upper electrode assembly 110a may be greater than the height h2 of the lower electrode assembly 110b, thereby making the electrode assemblies 110a and 110b have different sizes. Here, the electrode assemblies 110a and 110b may have the same width and length.

With respect to each of the electrode assemblies, 110a and 110b, a first electrode plate 111 may serve as a positive electrode, and a second electrode plate 112 may serve as a negative electrode, or vice versa.

The first electrode plate 111 may be formed by coating a first electrode active material, such as graphite or carbon, on a first electrode current collector made of a metal foil, such as copper or nickel. The first electrode plate 111 further includes a first electrode uncoated portion 111a where the first electrode active material is not formed. The first electrode uncoated portion 111a is a flow path of current between the first electrode plate 111 and the outside of the first electrode plate 111. However, the material of the first electrode plate 111 is not limited to those illustrated herein. With respect to each of the electrode assemblies, 110a and 110b, the first electrode uncoated portion 111a may be formed at one of opposite ends of the electrode assembly along the winding axis direction.

The second electrode plate 112 is formed by coating a second electrode active material, such as such as a transition metal, on a second electrode current collector made of a metal foil such as aluminum. The second electrode plate 112 further includes a second electrode uncoated portion 112a where the second electrode active material is not formed. The second electrode uncoated portion 112a is a flow path of current between the second electrode plate 112 and the outside of the second electrode plate 112. However, the material of the second electrode plate 112 is not limited to those illustrated herein. With respect to each of the electrode assemblies, 110a and 110b, the second electrode uncoated portion 112a may be formed at the other one of opposite ends of the electrode assembly along the winding axis direction.

The first electrode plate 111 and the second electrode plate 112 may be arranged to have different polarities.

The separator 113 is disposed between the first electrode plate 111 and the second electrode plate 112. The separator 113 prevents an electrical short and allows lithium ions to move between the first electrode plate 111 and the second electrode plate 112. The separator 113 may be made of polyethylene, polypropylene, or a composite film thereof. However, the material of the separator 113 is not limited to those illustrated herein.

A first terminal 120 and a second terminal 130 electrically connected to the first electrode plate 111 and the second electrode plate 112 are disposed at opposite ends of the electrode assembly 110.

The electrode assembly 110 is housed in the case 140 together with an electrolyte. The electrolyte may comprise a lithium salt such as $LiPF_6$ or $LiBF_4$ dissolved in an organic solvent such as EC (ethylene carbonate), PC (propylene carbonate), DEC (diethyl carbonate), EMC (ethyl methyl carbonate), or DMC (dimethyl carbonate). In addition, the electrolyte may be in a liquid, solid or gel phase.

The first terminal 120 is made of a metal or equivalents thereof, and is electrically connected to the first electrode plate 111. In addition, the first terminal 120 protrudes and extends a predetermined length upward through the cap plate 151.

The first terminal 120 may include a first electrode terminal 121, a first terminal nut 123, a first flange 128 and a first current collector 129.

The first electrode terminal 121 penetrates the cap plate 151 to then be electrically connected to the first current collector 129. The first electrode terminal 121 may be formed in a pillar shape. The first electrode terminal 121 may be formed such that a thread is formed on an outer circumferential surface of an upper pillar portion exposed to an upper portion of the cap plate 151. A lower pillar portion positioned at a lower portion of the cap plate 151 may be coupled to the first flange 128 to prevent the first electrode terminal 121 from being dislodged from the cap plate 151. Part of the lower pillar portion of the first electrode terminal 121 may be inserted into the first flange 128 and a terminal hole formed in the first connection unit 129a of the first current collector 129.

The first terminal nut 123 may be coupled to the first electrode terminal 121. A thread may be formed along the inner surface of the first terminal nut 123. The thread formed in the first terminal nut 123 may be engaged with a thread formed in the first electrode terminal 121, thereby fixing the first electrode terminal 121 to the cap plate 151.

The first flange 128 may be formed in a plate shape and may have a terminal hole. Part of the lower pillar portion of the first electrode terminal 121 may be inserted into the terminal hole of the first flange 128, thereby preventing the first electrode terminal 121 from being dislodged from the cap plate 151. It is to be understood that the first electrode terminal 121 may differ from what is described herein.

The first current collector 129 may include a first connection unit 129a and a second connection unit 129b.

The first connection unit 129a may be electrically connected to the first electrode terminal 121 and may be formed in a plate shape. The first connection unit 129a may have a terminal hole into which the lower pillar portion of the first electrode terminal 121 is inserted.

The second connection unit 129b may be vertically bent from one end of the first connection unit 129a and may extend lengthwise. That is, the second connection unit 129b may extend in a direction toward a bottom of the case 140. In addition, the second connection unit 129b may have a plurality of protruding parts 129c connected to the first electrode uncoated portion 111a of a respective one of the plurality of electrode assemblies 110a, 110b. Each of the protruding parts 129c may protrude in a direction opposite to the direction that the first electrode uncoated portion 111a protrudes from the respective electrode assembly. The protruding part 129c may be inserted into the winding core of the first electrode uncoated portion 111a. The first electrode uncoated portion 111a may be electrically welded in a state in which the first electrode uncoated portion 111a is bent toward the winding core. Therefore, the protruding part 129c may contact the inner surface of the first electrode uncoated portion 111a, and the first electrode plate 111 may be electrically connected to the first current collector 129.

As shown in FIG. 5B, a volume of a region of the second connection unit 129b connected to the lower electrode assembly 110b may be greater than a volume of a region of the second connection unit 129b connected to the electrode assembly 110a. For example, the second connection unit 129b may be formed such that a volume of a lower region of the second connection unit 129b is greater than that of an upper region of the second connection unit 129b by making the thickness of the second connection unit 129b increase in a downward direction, that is, in a direction away from the first connection unit 129a (T1<T2).

As shown in FIG. 5C, the volume of the lower region of the second connection unit 129b may become greater than that of the upper region of the second connection unit 129b by making the width of the second connection unit 129b increase in a downward direction (W1<W2).

However, the shape of the second connection unit 129b is not limited to the illustrated examples, and the second connection unit 129b may be formed by varying structural factors affecting a difference between the upper and lower volumes of the second connection unit 129b in various manners.

The first terminal 120 may have the same polarity (e.g., positive polarity) as the case 140 and the cap plate 151.

The second terminal 130 is made of a metal or equivalents thereof, and is electrically connected to the second electrode plate 112. In addition, the second terminal 130 protrudes and extends a predetermined length upward through the cap plate 151. The second terminal 130 may include a second electrode terminal 131, a second terminal nut 133, a second flange 138 and a second current collector 139.

The second electrode terminal 131 penetrates the cap plate 151 to then be electrically connected to the second current collector 139. The second electrode terminal 131 may be formed in a pillar shape. The second electrode terminal 131 may be formed such that a thread is formed on an outer circumferential surface of an upper pillar portion exposed to the upper portion of the cap plate 151. A lower pillar portion positioned at the lower portion of the cap plate 151 may be coupled to the second flange 138 to prevent the second electrode terminal 131 from being dislodged from the cap plate 151. Part of the lower pillar portion of the second electrode terminal 131 may be inserted into the second flange 138 and a terminal hole formed in the second connection unit 139a of the second current collector 139.

The second terminal nut 133 may be coupled the second electrode terminal 131. A thread may be formed along the inner surface of the terminal nut 133, and the thread formed in the second terminal nut 133 may be engaged with a thread formed in the second electrode terminal 131, thereby fixing the second electrode terminal 131 to the cap plate 151.

The second flange 138 may be formed in a plate shape, and may have a terminal hole. Part of the lower pillar portion of the second electrode terminal 131 may be inserted into the terminal hole of the second flange 138, thereby preventing the second electrode terminal 131 from being dislodged from the cap late 151. It is to be understood that the second electrode terminal 131 may differ from what is described herein.

The second current collector 139 may include a first connection unit 139a and a second connection unit 139b.

The first connection unit 139a may be electrically connected to the second electrode terminal 131 and may be formed in a plate shape. The first connection unit 139a may have a terminal hole into which a lower pillar portion of the second electrode terminal 131 is inserted.

The second connection unit 139b may be vertically bent from one end of the first connection unit 139a and may extend lengthwise. The second connection unit 139b may have a plurality of protruding parts 139c each being connected to the second electrode uncoated portion 112a of a respective one of the plurality of electrode assemblies 110a, 110b. The protruding part 139c may protrude in a direction opposite to the direction that the second electrode uncoated portion 112a protrudes from the respective electrode assembly. The protruding part 139c may be inserted into the winding core of the second electrode uncoated portion 112a. The second electrode uncoated portion 112a may be electrically welded in a state in which the second electrode uncoated portion 112a is bent toward the winding core. Therefore, the protruding part 139c may contact the inner surface of the second electrode uncoated portion 112a, and the second electrode plate 112 may be electrically connected to the second current collector 139.

Although not shown, the second current collector 139 may also be formed such that a volume of a lower region of the second current collector 139 may be greater than that of an upper region of the second current collector 139, like the first current collector 129 shown in FIGS. 5B and 5C.

The case 140 may be made of a conductive metal such as aluminum, an aluminum alloy, or nickel plated steel, and may be formed to have a substantially hexahedral shape having an opening 140a through which the electrode assembly 110, the first terminal 120 and the second terminal 130 are inserted to be placed in the case 140. The opening 140a is an opened top portion of the cap assembly 150. A pair of long side surfaces of the case 140 may face planar surfaces of each of the electrode assemblies 110a and 110b. The inner surface of the case 140 may be treated using an insulating process, thereby allowing the case 140 to be insulated from the electrode assembly 110, the first terminal 120, the second terminal 130 and the cap assembly 150.

The cap assembly 150 is coupled to the case 140. Specifically, the cap assembly 150 may include a first upper insulation member 127a, a first lower insulation member 127b, a first seal gasket 125, a second upper insulation member 137a, a second lower insulation member 137b, a second seal gasket 135, a cap plate 151, a plug 153, and a safety vent 154. The first upper insulation member 127a, the first lower insulation member 127b, the first seal gasket 125, the second upper insulation member 137a, the second lower insulation member 137b and the second seal gasket 135 may be classified as components of the first terminal 120 and/or the second terminal 130, rather than as components of the cap assembly 150. Alternatively, the first upper insulation member 127a, the first lower insulation member 127b, the first seal gasket 125, the second upper insulation member 137a, the second lower insulation member 137b and the second seal gasket 135 may be classified as independent components, respectively.

The first seal gasket 125 is made of an insulating material and may be disposed between the first electrode terminal 121 and the cap plate 151 to seal a portion between the first electrode terminal 121 and the cap plate 151. The first seal gasket 125 may prevent external moisture from permeating into the secondary battery 100. In addition, the first seal gasket 125 may prevent an electrolyte contained in the secondary battery 100 from flowing outside. In an exemplary embodiment, the first seal gasket 125 may be made of PFA (perfluoroalkoxy) that does not react with the electrolyte, but not limited thereto.

The first upper insulation member 127a may be interposed between the first terminal nut 123 and the cap plate 151. For example, the first upper insulation member 127a may closely contact a bottom surface of the first terminal nut 123 and a top surface of the cap plate 151. In addition, the first upper insulation member 127a may also closely contact the first seal gasket 125. The first upper insulation member 127a may insulate the first terminal nut 123 from the cap plate 151. In an exemplary embodiment, the first upper insulation member 127a may be made of PPS (polyphenylene sulfide), but not limited thereto.

The first lower insulation member 127b may be interposed between the first current collector 129 and the cap plate 151 and may prevent an electrical short therebetween. The first lower insulation member 127b may prevent an electrical short between the first flange 128 and the cap plate 151 and an electrical short between the first connection unit 129a and the cap plate 151. In an exemplary embodiment, the first lower insulation member 127b may be made of PPS (polyphenylene sulfide), but is not limited thereto.

The second seal gasket 135 is made of an insulating material and may be disposed between the second electrode terminal 131 and the cap plate 151 to seal a portion between the second electrode terminal 131 and the cap plate 151. The second seal gasket 135 may prevent external moisture from permeating into the secondary battery 100. In addition, the second seal gasket 135 may prevent an electrolyte contained in the secondary battery 100 from flowing outside. In an exemplary embodiment, the second seal gasket 135 may be made of PFA (perfluoroalkoxy), which does not react with the electrolyte, but the second seal gasket 125 is not limited thereto.

The second upper insulation member 137a may be interposed between the second terminal nut 133 and the cap plate 151. For example, the second upper insulation member 137a may closely contact a bottom surface of the second terminal nut 133 and a top surface of the cap plate 151. In addition, the second upper insulation member 137a may also closely contact the second seal gasket 135. The second upper insulation member 137a may insulate the second terminal nut 133 from the cap plate 151. In an exemplary embodiment, the second upper insulation member 137a may be made of PPS (polyphenylene sulfide), but is not limited thereto.

The second lower insulation member 137b may be interposed between the second current collector 139 and the cap plate 151 to prevent an electrical short therebetween. That is to say, the second lower insulation member 137b may prevent an electrical short between the second flange 138 and the cap plate 151 and an electrical short between the second connection unit 139a and the cap plate 151. In an exemplary embodiment, the second lower insulation member 137b may be made of PPS (polyphenylene sulfide), but is not limited thereto.

The cap plate 151 may have two terminal through-holes. The first terminal 120 and the second terminal 130 may penetrate through the terminal through-holes, respectively. The cap plate 151 seals the opening 140a of the case 140 and may be made of the same materials as the case 140. The cap plate 151 may be coupled to the case 140 by, for example, laser welding. Here, the cap plate 151 may have the same polarity as the first terminal 120, like the case 140.

The plug 153 may be provided to seal an electrolyte injection hole 151a of the cap plate 151.

The safety vent 154 may be installed in a vent hole 151b of the cap plate 151 and may have a notch 154a configured to be openable at a predetermined pressure.

It is to be understood that the cap assembly 150, first terminal 120 and second terminal 130 may vary from what is described herein.

Figure 7:
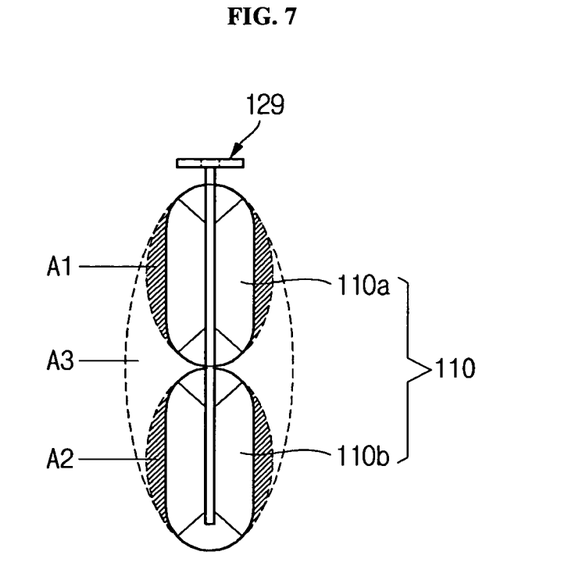
FIG. 7 illustrates the swelling reducing effect of an electrode assembly according to an exemplary embodiment.

FIG. 7 illustrates the swelling reducing effect of an electrode assembly according to an exemplary embodiment.

In FIG. 7, reference symbol A1 denotes a swelling section area of the upper electrode assembly 110a and reference symbol A2 denotes a swelling section area of the lower electrode assembly 110b. Reference symbol A3 denotes a swelling section area of a conventional unit electrode assembly, that is, a swelling section area that would exist if the upper and lower electrode assemblies 110a and 110b were replaced with a single electrode assembly having a height equal to the sum of the upper and lower electrode assemblies 110a and 110b.

Referring to FIG. 7, it may be confirmed that a sum (A1+A2) of swelling section areas of the multiple electrode assemblies 110a and 110b according to the embodiment is smaller than the swelling section area A3 of the conventional unit electrode assembly. In addition, a total swelling amount of the multiple electrode assemblies 110a and 110b is smaller than that of the conventional unit electrode assembly.

The reason of the foregoing will now be described. The electrode assemblies 110a and 110b according to the embodiment are configured to be vertically separated. A total of swelling forces applied from the respective electrode assemblies 110a and 110b is smaller than the swelling force applied from the conventional unit electrode assembly. Since the multiple electrode assemblies 110a and 110b according to the embodiment are configured such that both side surfaces (the widest, planar surfaces) of the electrode assemblies, where swelling occurs the most, are centrally separated into upper and lower portions, swelling forces are dispersed. Accordingly, the multiple electrode assemblies 110a and 110b according to the embodiment have reduced swelling amounts, compared to the conventional unit electrode assembly.

Moreover, in a case where multiple electrode assemblies 110a and 110b having different sizes are disposed in a longitudinal direction, a swelling force may be concentrated on the upper or lower portions of the long side surfaces of the case 140. In the conventional electrode assembly, a swelling force is concentrated on a central portion of the long side surface, which is typically the weakest part of the case 140. Accordingly, stress applied to the case 140 during swelling may be increased. By contrast, according to the embodiment, since the upper portion of the case 140 is close to a portion welded to the cap plate 151 and the lower portion of the case 140 is close to an edge portion thereof, the stress applied to the case 140 can be reduced even with the concentrated swelling force, compared to the conventional electrode assembly.

In addition, since use of the multiple electrode assemblies that are vertically disposed reduces an inertial mass, the durability of an electrode uncoated portion can be increased. Moreover, the electrode uncoated portion includes a protruding part of a current collector inserted into its winding core and is electrically welded in a state in which the electrode uncoated portion is bent toward the winding core. Therefore, the electrode uncoated portion can be physically connected to the current collector more firmly. Accordingly, the durability of the electrode uncoated portion can be further increased.

Further, resistance on a flow path of current connected to the lower electrode assembly 110b can be reduced by making a volume of a lower region of the current collector 129, 139 greater than that of an upper region of the current collector 129, 139. That is to say, since the lower region of the current collector 129, 139 is disposed farther than the upper electrode assembly 110a in view of the electrode terminal 121, 131, a relative current loss may be generated if the upper region and the lower region of the current collector 129, 139 have the same volume. According to embodiments, the resistance of the lower region of the current collector 129, 139 may be relatively reduced by making the volume of the lower region greater than that of the upper region of the lower region of the current collector 129, 139, thereby reducing the current loss caused by using the multiple electrode assemblies.

Accordingly, a secondary battery having reduced cell swelling and improved durability may be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A secondary battery comprising:
a plurality of electrode assemblies;
a current collector electrically connected to each electrode assembly of the plurality of electrode assemblies;
a case accommodating the plurality of electrode assemblies and the current collector;
a cap plate sealing the case; and
an electrode terminal electrically connected to the current collector and penetrating the cap plate,
wherein the plurality of electrode assemblies are arranged such that an axis of each electrode assembly is parallel to a bottom surface of the case and the plurality of electrode assemblies are disposed in a longitudinal direction with respect to each other, the longitudinal direction being a direction between the cap plate and the bottom surface,
the plurality of electrode assemblies includes at least an upper electrode assembly and a lower electrode assembly, and
the upper electrode assembly is closer to the cap plate than the lower electrode assembly is to the cap plate, and the lower electrode assembly is closer to the bottom surface of the case than the upper electrode assembly is to the bottom surface.

2. The secondary battery as claimed in claim 1, further comprising an insulating member between the current collector and the cap plate and between the electrode terminal and the cap plate.

3. The secondary battery as claimed in claim 1, wherein:
the upper electrode assembly and the lower electrode assembly have different sizes.

4. The secondary battery as claimed in claim 1, wherein each electrode assembly is configured such that:
a first electrode plate and a second electrode plate, each having an electrode uncoated portion, are wound about a winding axis with a separator interposed therebetween, and
the electrode uncoated portion of the first electrode plate and the electrode uncoated portion of the second electrode plate are formed at opposite ends of the electrode assembly in a direction of the winding axis thereof.

5. The secondary battery as claimed in claim 4, wherein:
each electrode assembly is pressed to have a pair of planar surfaces, and
each planar surface of the pair of planar surfaces is disposed to face a respective one of a pair of long side surfaces of the case.

6. The secondary battery as claimed in claim 5, wherein the current collector includes:
a first connection unit having a terminal hole and coupled with the electrode terminal; and
a second connection unit having a plurality of protruding parts, each protruding part being connected to an electrode uncoated portion of one of the electrode assemblies, and the second connection unit extending lengthwise from one end of the first connection unit.

7. The secondary battery as claimed in claim 6, wherein the second connection unit is vertically bent from one end of the first connection unit, and each protruding part protrudes in a direction facing the electrode uncoated portion of one of the electrode assemblies.

8. The secondary battery as claimed in claim 6, wherein:
a volume of a region of the second connection unit connected to the lower electrode assembly is greater than that of a region of the second connection unit connected to the upper electrode assembly.

9. The secondary battery as claimed in claim 6, wherein each protruding part is inserted into a winding core of one of the electrode assemblies to contact the electrode uncoated portion of the electrode assembly.

10. The secondary battery as claimed in claim 9, wherein each electrode uncoated portion of the plurality of electrode assemblies is welded in a state in which the electrode uncoated portion is bent toward the winding core of the electrode assembly.

\* \* \* \* \*